United States Patent
Meijer et al.

(10) Patent No.: US 9,183,407 B2
(45) Date of Patent: Nov. 10, 2015

(54) PERMISSION BASED QUERY PROCESSING

(75) Inventors: Henricus Johannes Maria Meijer, Mercer Island, WA (US); Evelyne Viegas, Redmond, WA (US); Savas Parastatidis, Seattle, WA (US); Stephen Harris Toub, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 15 days.

(21) Appl. No.: 13/283,794

(22) Filed: Oct. 28, 2011

(65) Prior Publication Data

US 2013/0110876 A1 May 2, 2013

(51) Int. Cl.
*G06F 7/00* (2006.01)
*G06F 17/00* (2006.01)
*G06F 21/62* (2013.01)

(52) U.S. Cl.
CPC .................................. *G06F 21/6227* (2013.01)

(58) Field of Classification Search
CPC ... G06Q 30/02; G06Q 30/08; G06Q 30/0247; G06Q 30/0255; G06Q 30/0269; G06F 21/60; G06F 17/30929; G06F 17/30463; G06F 17/30448; G06F 17/30536; G06F 17/30471; G06F 17/30867; G06F 17/30734; Y10S 707/99939; Y10S 707/99935; Y10S 707/99932; Y10S 707/99934
See application file for complete search history.

(56) References Cited

U.S. PATENT DOCUMENTS

| | | | |
|---|---|---|---|
| 5,521,980 A | 5/1996 | Brands | |
| 6,148,342 A * | 11/2000 | Ho | 709/225 |
| 6,253,203 B1 * | 6/2001 | O'Flaherty et al. | 1/1 |
| 6,330,564 B1 * | 12/2001 | Hellerstein et al. | 1/1 |
| 6,473,800 B1 * | 10/2002 | Jerger et al. | 709/226 |
| 7,353,532 B2 | 4/2008 | Duri | |
| 7,580,919 B1 * | 8/2009 | Hannel et al. | 1/1 |
| 2002/0069206 A1 * | 6/2002 | Bergman et al. | 707/100 |
| 2003/0069882 A1 * | 4/2003 | Nieswand et al. | 707/5 |
| 2003/0177119 A1 * | 9/2003 | Cole | 707/7 |
| 2003/0187848 A1 * | 10/2003 | Ghukasyan et al. | 707/9 |
| 2004/0068477 A1 | 4/2004 | Gilmour et al. | |
| 2004/0103306 A1 * | 5/2004 | Paddock et al. | 713/200 |
| 2005/0071331 A1 * | 3/2005 | Gao et al. | 707/4 |
| 2005/0108526 A1 * | 5/2005 | Robertson | 713/166 |
| 2005/0177570 A1 * | 8/2005 | Dutta et al. | 707/9 |

(Continued)

FOREIGN PATENT DOCUMENTS

WO     WO 0182556 A2 * 11/2001
WO     WO 2005094175 A2 * 10/2005

OTHER PUBLICATIONS

Preserving Privacy in Web Services, Rezgui et al, WIDM, pp. 56-62, Nov. 8, 2002.*

(Continued)

*Primary Examiner* — Augustine K Obisesan
(74) *Attorney, Agent, or Firm* — Timothy Churna; Nate Drakos; Micky Minhas

(57) ABSTRACT

A technique for protecting the privacy of a query is provided using permissions that may be derived from an analysis of the context of the query. A monitoring component can be provided to receive or intercept queries directed at a datastore, and a privacy component is provided that analyzes permissions associated with the queries. The privacy component can also determine access levels of the queries based on the analysis of the permissions. A response component can then be provided to answer the queries in accordance with the access levels of the queries.

18 Claims, 10 Drawing Sheets

(56) References Cited

U.S. PATENT DOCUMENTS

| | | | |
|---|---|---|---|
| 2005/0216465 A1* | 9/2005 | Dutta et al. | 707/9 |
| 2005/0289342 A1* | 12/2005 | Needham et al. | 713/169 |
| 2006/0184996 A1* | 8/2006 | Condon | 726/2 |
| 2006/0277166 A1* | 12/2006 | Vogler-Ivashchanka et al. | 707/3 |
| 2006/0277413 A1 | 12/2006 | Drews | |
| 2007/0078803 A1* | 4/2007 | Gilmour et al. | 707/1 |
| 2007/0113270 A1* | 5/2007 | Kraemer et al. | 726/4 |
| 2007/0136237 A1* | 6/2007 | Barker et al. | 707/2 |
| 2007/0168336 A1* | 7/2007 | Ransil et al. | 707/3 |
| 2009/0045920 A1* | 2/2009 | McQuaide et al. | 340/10.2 |
| 2009/0073033 A1* | 3/2009 | Price | 342/357.07 |
| 2009/0136033 A1 | 5/2009 | Sy | |
| 2009/0138276 A1 | 5/2009 | Hayashida | |
| 2009/0138722 A1* | 5/2009 | Lennie et al. | 713/181 |
| 2009/0271001 A1* | 10/2009 | Westphal et al. | 700/3 |
| 2009/0287704 A1* | 11/2009 | Yang et al. | 707/9 |
| 2011/0113050 A1* | 5/2011 | Youn et al. | 707/757 |

OTHER PUBLICATIONS

Authorized Private Keyword Search over Encrypted Personal Health Records in Cloud Computing, Li et al., 31st International Conference on Distributed Computing System (ICDCS), pp. 383-392, Jun. 20-24, 2011.*

Private Query on Encrypted Data in Multi-user Settings, Bao et al., LNCS 4991, pp. 71-85, 2008.*

Privacy-Preserving Queries on Encrypted Data, Yang et al., LNCS 4189, pp. 479-495, 2006.*

Hiding Tree-Structured Data and Queries from Untrusted Data Stores, Lin et al, Information Systems Security, pp. 22-38, May/Jun. 2004.*

View Security as the Basis of Data Warehouse Security, Rosenthal et al, Proceedings of the International Workshop on Design and Management of Data Warehouses (DMDW'2000), Jun. 5-6, 2000.*

Subramanian, N., et al.; ElliPS: A Privacy Preserving Scheme for Sensor Data Storage and Query, IEEE, Apr. 2009; pp. 936-944; http://ieeexplore.ieee.org/stamp/stamp.jsp?tp=&arnumber=5062004.

Hu, Haibo, et al., Processing Private Queries over Untrusted Data Cloud Through Privacy Homomorphism, Jul. 8, 2011; http://www.comp.hkbu.edu.hk/~haibo/papers/icde11-privacy.pdf.

Kodeswaran, Palanivel and Viegas Evelyne, A Policy Based Infrastructure for Social Data Access with Privacy Guarantees, 2010 IEEE International Symposium on Policies for Distributed Systems and Networks.

* cited by examiner

PERMISSION BASED QUERY PROCESSING

TECHNICAL FIELD

The subject disclosure relates to permission based query processing and maintenance of associated privacies.

BACKGROUND

Privacy in the increasingly connected and networked world is a growing issue as large volumes of data, which once could remain hidden, are being offered up for public consumption. Online social networking applications use information about users to create optimized or customized experiences. These social networking users often want the customized experience, but want to limit the amount of personal information that is shared.

It is currently possible to completely prevent the ability to see your information by making it entirely private, or by encrypting it. Doing this, however, hinders the ability to fully participate in social networking applications. There are also currently ways of making some of your data private, and other portions of the data public. These methods however don't allow for selective filtering of queries, where privacy depends in part on who is asking the question, or where privacy is dependent on other related circumstances.

Another problem with current privacy systems is that when queries are answered, all or a portion of the data being queried can be exposed. For instance, querying a database can expose much of the database, and extraneous information can sometimes be explicitly discovered, or implicitly inferred. Similarly, if encrypted data is queried, normally the data is decrypted before the query can be processed, and then re-encrypted afterwards. Homomorphic encryption allows operations to be performed on encrypted data and get results without having to decrypt the data. However, such encryption techniques have not yet been fully explored in terms of applications and scenarios based thereon.

The above-described deficiencies of today's privacy related issues are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with privacy related issues in query processing.

For instance, an embodiment includes receiving, by at least one computing device, queries directed at a datastore, analyzing permissions associated with the queries, wherein analyzing the permissions includes determining access levels of the queries. Then, in response to the determining the access levels, responding to the queries while masking data in the datastore. Additionally, another embodiment can include analyzing query contexts and filtering responses to the queries in response to the queries contexts, and selecting responses to the queries in response to the filtering.

In one non-limiting implementation, a monitoring component can be configured to monitor queries directed at a datastore. A privacy component can further be configured to analyze permissions associated with the queries, wherein the privacy component is further configured to determine access levels of the queries. Additionally, a response component can be configured to answer the queries in accordance with the access levels of the queries, wherein the response component is further configured to mask data in the datastore.

In another non-limiting implementation, a computer-readable storage medium comprising computer-readable instructions that, in response to execution by a computing system, cause the computing device including at least one processor to perform operations such as: monitoring queries directed at a datastore; analyzing permissions associated with the queries, wherein analyzing the permissions includes determining access levels of the queries; and in response to the determining access levels of the queries, responding to the queries while masking data in the datastore.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

By way of introduction, the subject matter disclosed herein relates to various embodiments relating to permission based query processing. In various embodiments, permissions can be bundled with queries, based on query context, be embedded at a node that a query is received at, be static, or be dynamic. The query processing system takes the permissions into consideration when formulating responses, and maintains privacy of the data that queried.

In one embodiment, as a layer of privacy, the various services that provide answers to queries are prevented from knowing what the user queries are. The person controls what the service providing the data knows about the query. Elliptic curves can be applied to encrypt data, such as query data. In other embodiments, encrypted data can be queried without knowing what the underlying data is, so that at most, a third party can observe a result of a given query without access to the query or the underlying data. Homomorphic encryption can also be applied to query encrypted data and get a decrypted result without having to decrypt the data.

In other embodiments, permission based query processing is explored in which portions of data in a graph are open and other portions are closed. Embodiments describe how to designate and track which parts of the graph and associated data structures are open and which are closed. A graph can be used to represent interactions in a networked environment, such as a social networking application, where every action made by a person can be represented as a node in the graph. Nodes can have associated permissions as well. Different nodes in the graph can have different permissions associated with the nodes.

In another embodiment, a service manages queries to determine if there is an intersection of data between various parties. If there are data commonalities, the parties can be asked if they would like to share the commonalities with each other. Real time problem identification, query formation, and permission granting are explored. In one example, permissions can be implemented as properties or characteristics that travel with each query. In other examples, permissions can be embedded in the nodes that queries traverse.

Permission Based Query Processing

Figure 1:
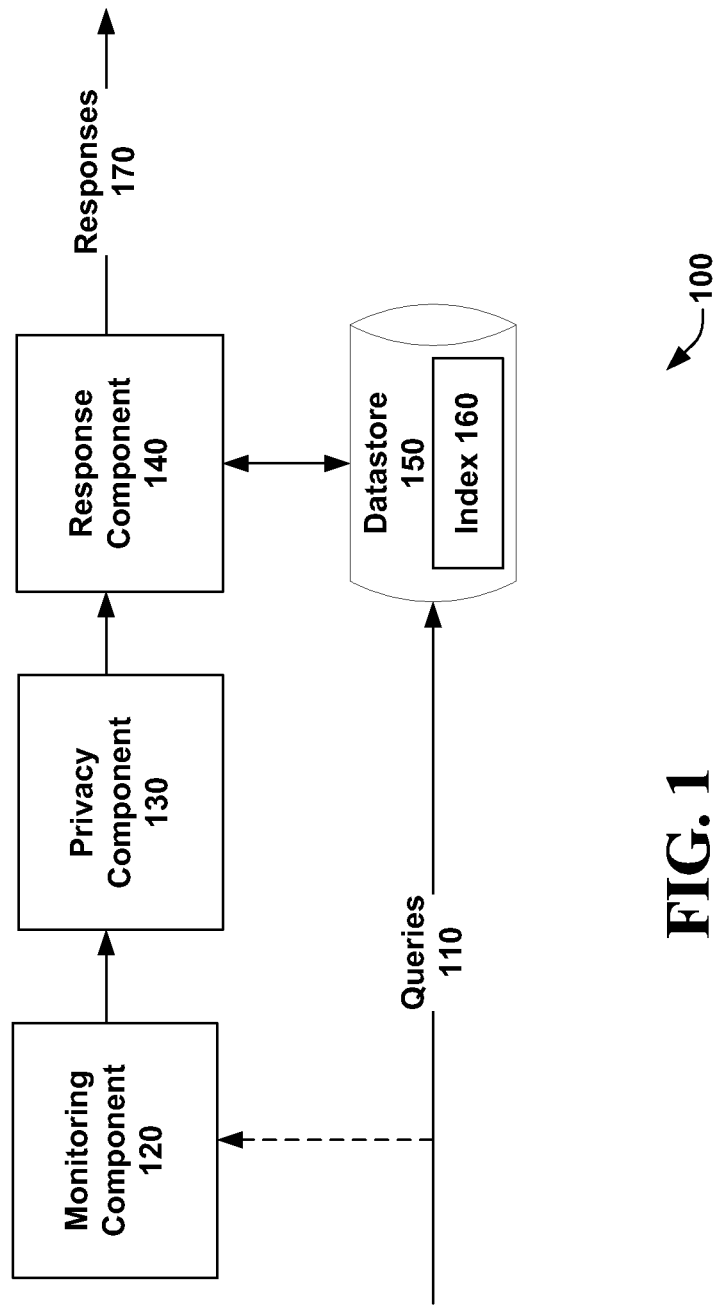
FIG. 1 is a block diagram illustrating an exemplary system that facilitates permission based query processing in accordance with an embodiment.

Referring now to the drawings, with reference initially to FIG. 1, system 100 can be provided to facilitate permission based query processing according to an embodiment. System 100 can include monitoring component 120 configured to monitor queries 110 that are directed at datastore 150. Privacy component 130 can be provided to analyze permissions associated with the queries 110, and response component 140 can be provided to answer the queries with responses 170 using datastore 150 and associated index 160.

Monitoring component 120 can be configured to monitor queries directed at datastore 150. The queries 110 can be requests for information, or can represent requests for interactions or potential interactions between nodes in a graph that represent a social networking environment. In that example, the queries 110 can request that an interaction take place, or determine if an interaction is possible. Monitoring component 120 can further be configured to determine what permissions are associated with the queries 110. The permissions can be bundled with the queries 110, or a general set of permissions can define access levels for the queries 110.

Once monitoring component 120 identifies the permissions, privacy component 130 can be provided to analyze the permissions associated with the queries 110. The permissions can contain information about whether the queries 110 are to be answered, or what access level they may be given.

In the social networking example, where the queries 110 represent requests for interactions on a graph, the permissions can define whether the interaction may be allowed to proceed, or whether the requested interaction may be granted read or write access. In an example, if one person has posted a comment in a social networking environment, the permissions associated with the queries 110 can determine whether the queries, or the requested interaction may be granted read or write levels of access.

In another embodiment, the queries 110 can be requests for information or search terms to be operated on datastore 150. The permissions associated with queries 110 can grant or deny access to datastore 150 or specify which portions of datastore 150 the queries 110 have access to.

The permissions can be bundled with and travel with the queries 110. In this case, the permissions can be specific to the query source. Alternatively, the permissions can be embedded in the datastore, or at the node the queries 110 are directed at. In that case, the permissions are general and can apply to any query directed at the node or datastore 150.

In another embodiment, permissions can be time dependent. Permissions can change depending on time of day or date. Permissions can also last for a set period of time, after which they expire. Permissions can follow a schedule, or can change randomly or semi-randomly.

Once privacy component 130 determines an access level for the queries 110, response component 140 can be configured to answer the queries 110 by issuing responses 170 in accordance with the access levels determined by privacy component 130. Response component 140 can provide responses 170 by extracting data from datastore 150 or direct datastore 150 to make available all or a portion of its data to queries 110. Response component 140 can also utilize datastore index 160 in datastore 150 to provide responses 170.

Response component 140 can also provide responses 170 to queries 110 while masking data in the datastore. Response component 140 can be configured to answer queries 110 with the minimum amount of data to satisfy queries 110, and keep the remainder of the data private. In one example, response component 140 can answer queries 110 in the affirmative or negative while keeping the overall content or structure of datastore 150 private. Response component 140 can also retrieve information from datastore index 160 when providing responses 170. Datastore index 160 can provide a summary of data stored in datastore 150 while keeping the bulk of the data private.

In various embodiments, response component 140 can employ homomorphic encryption to provide responses 170 while keeping data in datastore 150 private. When the data in datastore 150 is homomorphically encrypted, it is possible to perform operations on the encrypted data and receive decrypted results. For instance, operations such as addition and multiplication of encrypted data can return the same result as if the encrypted data were decrypted. This allows query operations to be performed on encrypted data without having to decrypt it. Accordingly, datastore 150 can be encrypted and can be queried, and responses 170 can be provided without having to decrypt datastore 150.

Figure 2:
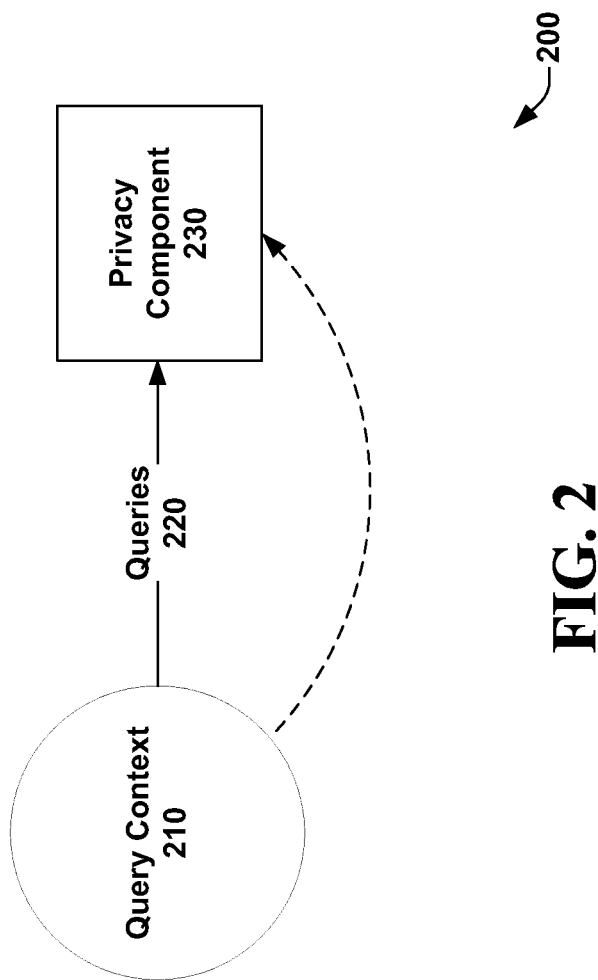
FIG. 2 is a block diagram illustrating an exemplary system that facilitates the use of context in determining the permissions of a query in accordance with an embodiment.

Turning now to FIG. 2, block diagram illustrating an exemplary system that facilitates the use of context in determining the permissions of a query in accordance with an embodiment is shown. System 200 represents a system wherein privacy component 230 takes query context 210 into account when evaluating the permissions of queries 220 to determine access levels and capabilities of queries 220.

In an embodiment, privacy component 230 can receive queries 220 or receive an indication of queries 220. To assist in analyzing the permissions of queries 220, privacy component 230 can analyze query context 210. Query context 210 can include, but is not limited to, information such: source of queries; time that queries were initiated; content of queries; and location where queries were initiated. Query context 210 can provide the sole source of information used to determine permissions and access levels, or can be used in addition to other information to define access levels of queries 220.

In another embodiment, query context 210 can be used to define permissions in a social networking environment. Read and write access levels may be predefined based on a relationship of the query source to the query subject. In an example, permission to read comments by friends can be allowed, but permission to read comments by friends of friends may not be allowed. In another example, permission to read comments by friends and friends of friends can be allowed, whereas permission to reply can be limited to friends. Any combination of the above is possible, and such combinations are not be construed to be limited to the examples given.

In an alternative embodiment query context 210 can include a level of trust of the source of queries 220. Sources with higher trust levels can be granted greater permissions and access levels. Trust level can be based on the number of previous interactions, or the outcome of previous interactions. Additionally, trust level can be based upon the authenticity of the source. A reputable source for instance can have a higher associated trust level than a source with a low reputation.

Figure 3:
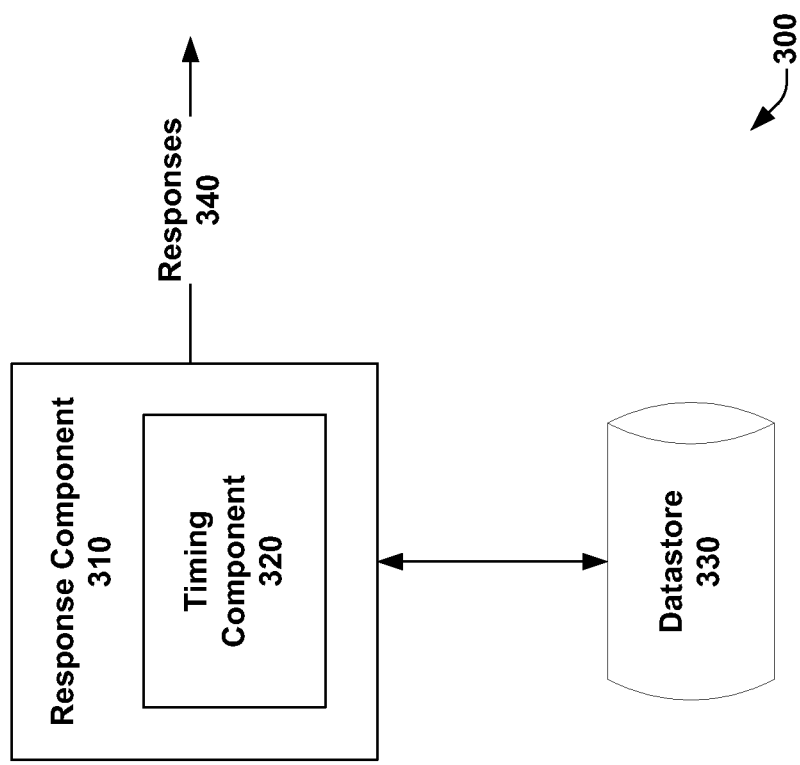
FIG. 3 is a block diagram illustrating an exemplary system that randomizes response times to queries in accordance with an embodiment.

Turning now to FIG. 3, a block diagram illustrating an exemplary system that randomizes response times to queries in accordance with an embodiment is shown. The response times can be independent of a size of the datastore. System 300 can be provided to facilitate the randomization of a response time when answering queries, in order to protect, and mask the content and structure of data in datastore 330. Timing component 320 can be provided in response component 310 to modulate or randomize the time taken to answer the queries with responses 340.

As stated in the background section, it is possible to implicitly infer the size or structure of a set of data. One of the ways that this can be done is by timing the amount of time taken to respond to a query. Such sidechannel attacks can be successful in inferring the size and structure, or potentially other characteristics of a set of data. For instance, if the time taken to respond to a query is very short, it can be inferred that there is only a limited amount of data. If the time taken to respond is longer, it can be inferred that there is a larger amount of data. One way to defeat such a sidechannel attack is to randomize the time taken to respond to the queries.

In an embodiment, timing component 320 can randomize the time taken for response component 310 to provide responses 340 from datastore 330. Timing component 320 can also modify the time taken to respond with responses 340 in other ways. For instance, timing component can delay the response by a defined period of time, or can alternate delaying responses 170.

Figure 4:
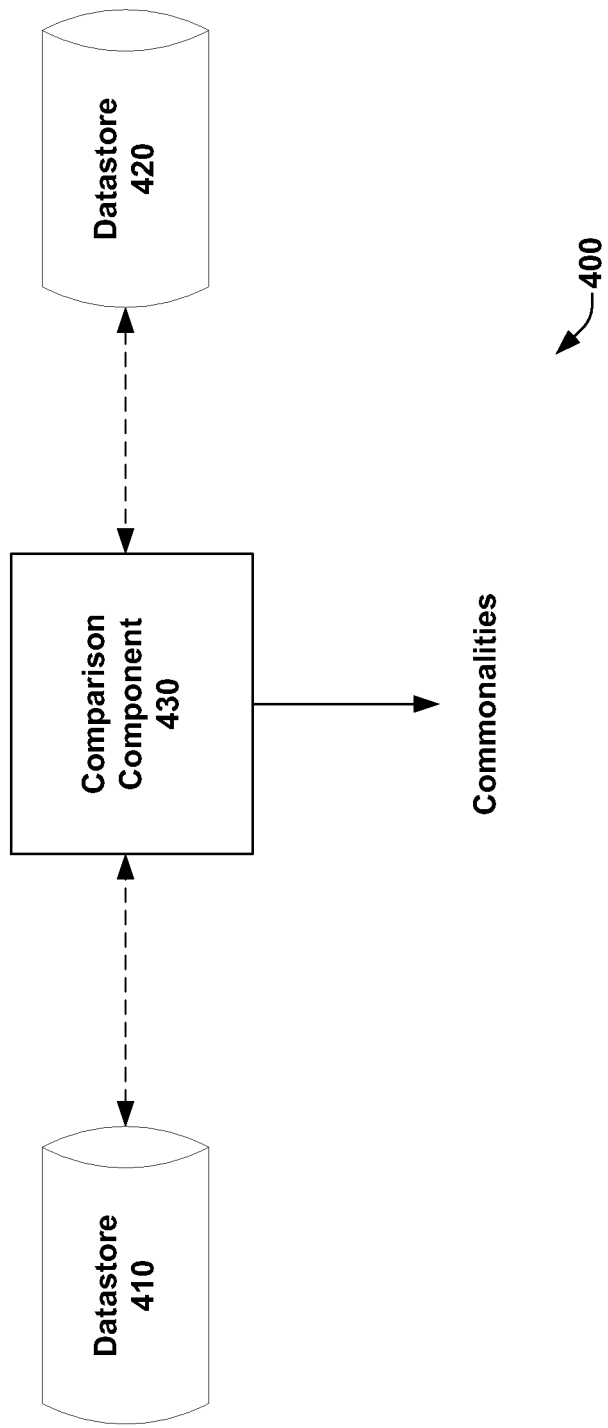
FIG. 4 is a block diagram illustrating an exemplary system for comparing datastores to determine commonalities in accordance with an embodiment.

Turning now to FIG. 4, a block diagram illustrating an exemplary system for comparing datastores to determine commonalities in accordance with an embodiment is shown. System 400 can be provided to compare data between datastore 410 and datastore 420 using comparison component 430, while keeping data from each datastore private.

Comparing data between two sources is useful to determine common reference points or shared experiences. To compare the information, comparison component 430 can be configured to identify commonalities between datastore 410 and datastore 420 while keeping the data in datastore 410 and datastore 420 hidden from each other.

In an embodiment, data in datastore 410 and datastore 420 can be homomorphically encrypted. When the data in datastore 410 and datastore 420 is homomorphically encrypted, it is possible to perform operations on the encrypted data and receive decrypted results. For instance, operations such as addition and multiplication of encrypted data can return the same result as if the encrypted data were decrypted. This allows query operations to be performed on encrypted data without having to decrypt it. Accordingly, comparison component 430 can send queries to datastore 410 and datastore 420 and receive answers back while both datastore 410 and datastore 420 remain encrypted.

In another embodiment, comparison component 430 can conduct a specific search for commonalities. In an example, if a user of a social networking application wants to find out whether other people have a shared experience, or shared trait, comparison component 430 can be instructed to determine whether other people share a commonality with the user. Comparison component 430 can be configured to send queries to datastores associated with the other people to determine if the data matches. In one instance, comparison component 430 can be configured to keep the results private with only the user, or in another instance, the results can be shared with the other people.

Figure 5:
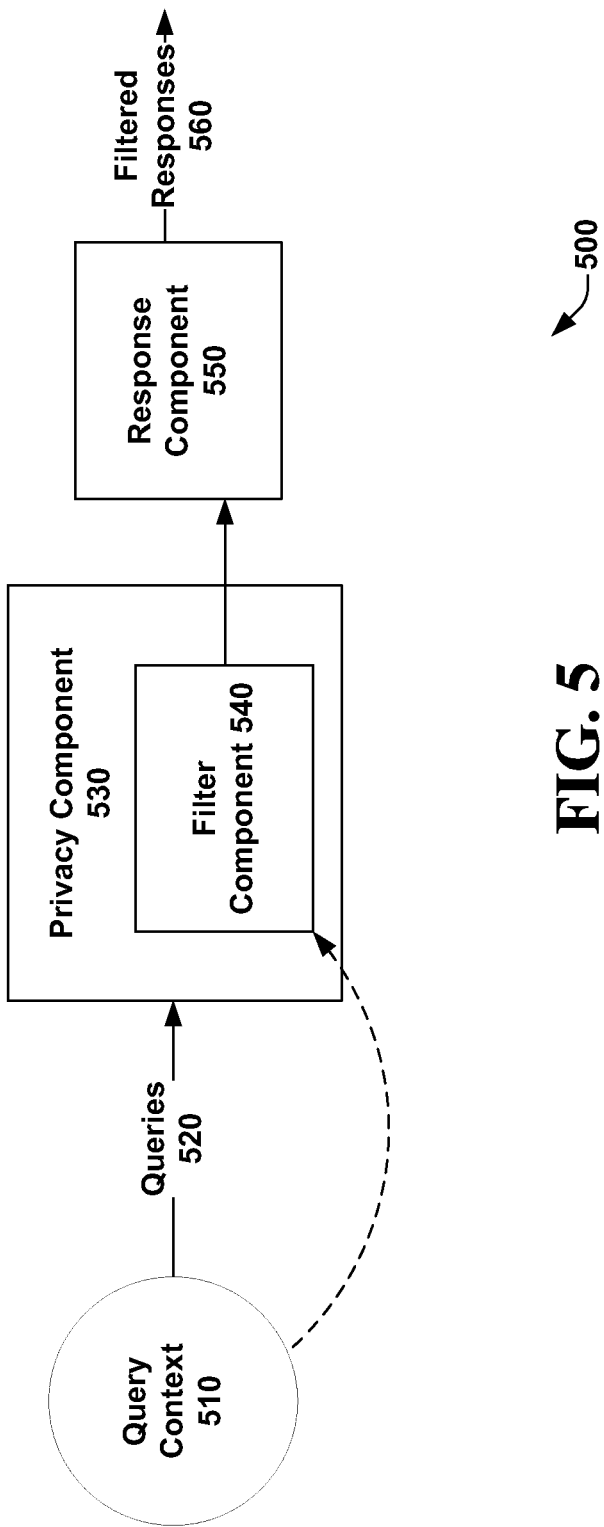
FIG. 5 is a block diagram illustrating an exemplary system for filtering query responses in accordance with an embodiment.

Turning now to FIG. 5, a block diagram illustrating an exemplary system for filtering query responses in accordance with an embodiment is shown. System 500 can be provided to filter query responses in response to query context. Privacy component 530 can include filter component 540 that receives queries 520 and analyzes query context 510. Filter component 540 can forward the filter results to response component 550 which provides filtered responses 560 in response to receiving the filter results.

In social networking environments, it may be desirable to limit which information about yourself is available to different people. This can be helpful when your social networking environments include people from different social settings, such as work, friends, family, and et cetera. It may be undesirable to have all information available to all of the social groups, or even specific individuals.

System 500 can be provided to selectively filter results so that it is possible to limit the amount of information that is available on a selective basis. Privacy component 530 and filter component 540 therein can receive queries 520. Filter component 540 can analyze query context 510 to produce the filtering results. Query context 510 can include, but is not limited to, information such: source of queries; time that queries were initiated; content of queries; and location where queries were initiated. Query context 510 can provide the sole source of information used to determine permissions and access levels, or can be used in addition to other information to define access levels of queries 520.

Query context can be analyzed to determine how the sources of queries 520 should be classified. Upon classification, filter component 540 can apply a set of rules to the classification and filter the queries based upon the set of rules. Filter component 540 can also provide a set of possible filter results which can be selected from when response component 550 answers the queries. In that case, filtered responses 560 can be selected from among a larger set of filtered responses.

The set of rules can define the data that is visible or discoverable by specific groups. In an example, the set of rules can define that work-related contacts or query sources are unable to query or discover personal information. Similarly, family members may be ineligible to view or discover certain other portions of data. The set of rules can be more specific as well, where certain people with specific context can be filtered out. For instance, if a person goes on vacation, and meets people on vacation, those people he met may only be able to query data related to the vacation.

Once the filtering results are received by response component 550, response component 550 can automatically provide filtered responses 560. Alternatively, response component 550 can provide a set of possible responses of which filtered responses 560 can be selected from.

The above are solely non-limiting examples of how the set of rules can be used in conjunction with query context to filter results, and should not be construed to be the only possible examples of how system 500 can operate.

Figure 6:
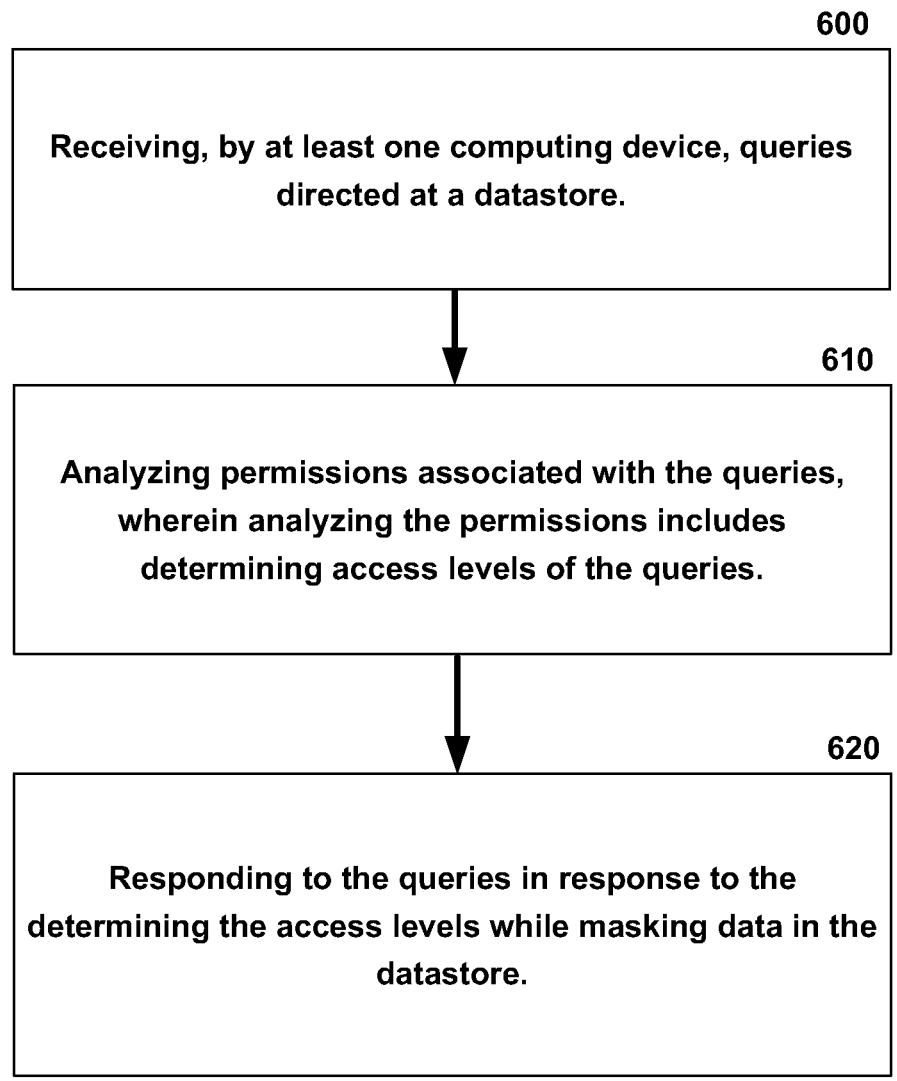
FIG. 6 is a flow diagram illustrating an exemplary non-limiting embodiment for responding to queries in accordance with an embodiment.
Figure 7:
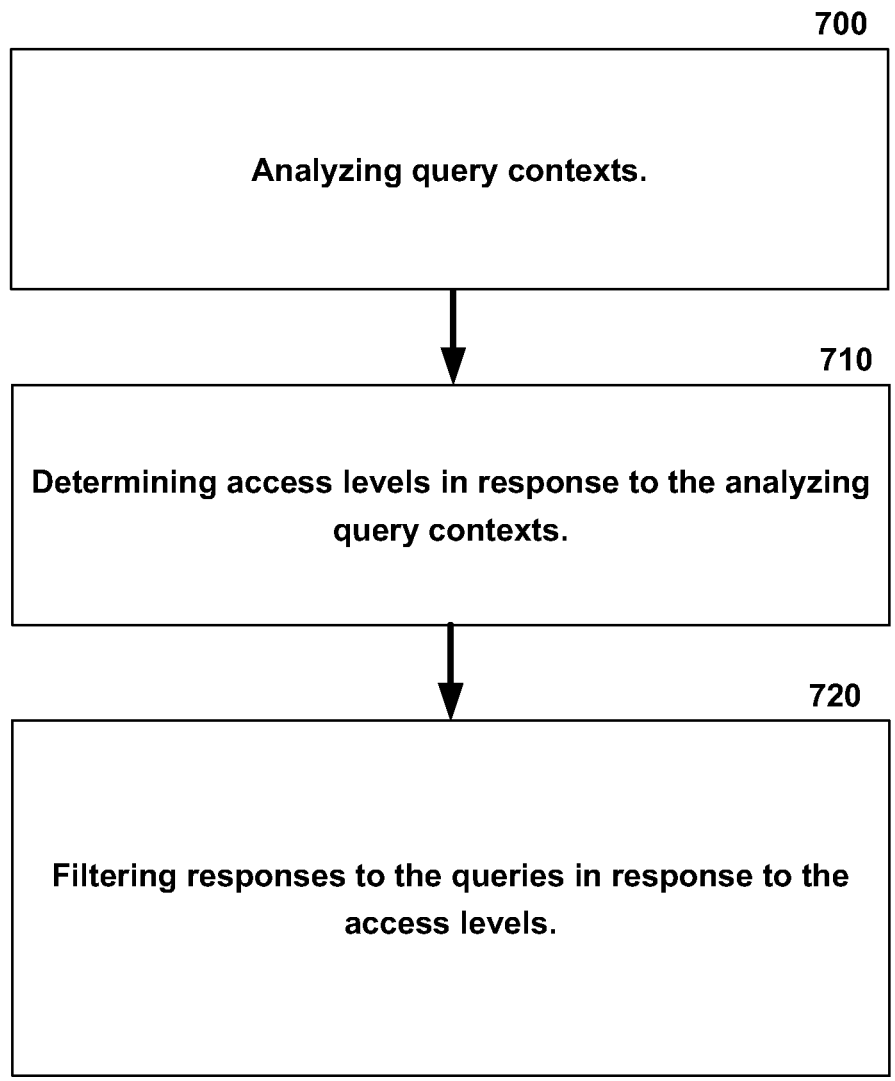
FIG. 7 is a flow diagram illustrating an exemplary non-limiting embodiment for analyzing query contexts and filtering responses in accordance with an embodiment.

FIG. 6-FIG. 7 illustrate process in connection with the aforementioned systems. The processes in FIG. 6-FIG. 7 can be implemented for example by systems 100-500 illustrated in FIG. 1-FIG. 5 respectively.

FIG. 6 is a flow diagram illustrating an exemplary non-limiting embodiment for responding to queries in accordance with an embodiment. At 600, queries directed at a datastore are received by at least one computing device. At 610, permissions associated with the queries are analyzed, wherein the analyzing the permissions includes determining access levels of the queries. At 620, the queries are responded to in response to determining the access levels of the queries while masking the data in the datastore.

At 600, queries are received by a computing device, where the queries are directed at a datastore. The datastore can be on the computing device, or alternatively the computing device can intercept or monitor the queries that are directed at another datastore. In one embodiment, the queries can be requests for information, or can represent requests for interactions or potential interactions between nodes in a graph that represent a social networking environment. In that example, the queries can request that an interaction take place, or determine if an interaction is possible. In another embodiment, the queries can be search terms to be operated on a datastore.

At 610, the analyzing the permissions associated with the queries can include analyzing permissions that come bundled with the queries. Additionally, local permissions can be embedded at a node the query was received at. In that case, the local permissions apply to all queries, and are not query specific. Local permissions can change over time and access levels can be updated in response to the changing local permissions.

In the social networking example, where the queries represent requests for interactions on a graph, the permissions can define whether the interaction should be allowed to proceed, or whether the requested interaction should be granted read or write access. In an example, if one person has posted a comment in a social networking environment, the permissions associated with the queries can determine whether the queries, or the requested interaction should be granted read or write levels of access.

In another embodiment, the analyzing the permissions can also include analyzing query contexts. Query context can include, but is not limited to, information such: source of queries; time that queries were initiated; content of queries; and location where queries were initiated. Query context can provide the sole source of information used to determine permissions and access levels, or can be used in addition to other information to define access levels of queries.

In another embodiment, query context can be used to define permissions in a social networking environment. Read and write access levels may be predefined based on a relationship of the query source to the query subject. In an example, permission to read comments by friends can be allowed, but permission to read comments by friends of friends may not be allowed. In another example, permission to read comments by friends and friends of friends can be allowed, whereas permission to reply can be limited to friends.

Once the access levels of the queries are determined, at 620, the queries are responded to while masking data in the datastore. The queries can be answered with the minimum amount of data to satisfy the queries, and keep the remainder of the data private. In one example, queries can be answered affirmatively or negatively while keeping the overall content or structure of the datastore private. Queries can also be answered using a datastore index. Datastore indexes can provide a summary of data stored in datastore while keeping the bulk of the data private.

FIG. 7 is a flow diagram illustrating an exemplary non-limiting embodiment for analyzing query contexts and filtering responses in accordance with an embodiment. At 700, query contexts can be analyzed. At 710, in response to the analyzing the query contexts, access levels of the queries can be determined. At 720, responses to the queries are filtered in view of the access levels.

Query context can be analyzed to determine how the sources of queries should be classified. Upon classification, access levels for the queries can be determined based on a set of rules. The set of rules can define the data that is visible or discoverable by specific groups. In an example, the set of rules can define that work-related contacts or query sources are unable to query or discover personal information. Similarly, family members may be ineligible to view or discover certain other portions of data. The set of rules can be more specific as well, where certain people with specific context can be filtered out.

At 720, the access levels determined for the queries can then be used to filter the responses. Some queries can have access to all, or a portion of the data, whereas other queries may not have access at all.

Figure 8:
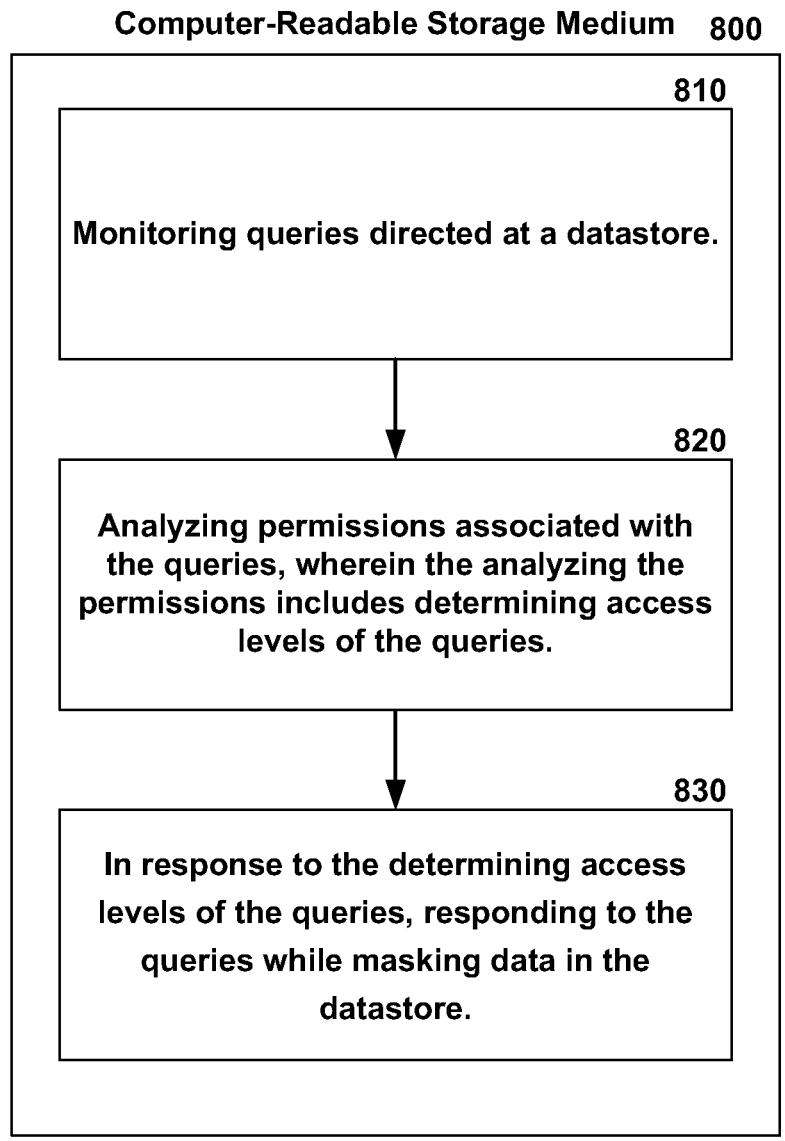
FIG. 8 illustrates a flow diagram of an example, non-limiting embodiment of a set of computer-readable instructions for responding to queries in accordance with an embodiment.

Turning now to FIG. 8 a flow diagram of an example, non-limiting embodiment of a set of computer-readable instructions for responding to queries in accordance with an embodiment is shown. Computer-readable storage medium 800 can include computer executable instructions that cause a computer to perform operations. At 810, the operations can include monitoring queries directed at a datastore. At 820, the operations can include analyzing permissions associated with the queries, wherein the analyzing the permissions includes determining access levels of the queries. At 830, the operations can include responding to the queries in response to the determining the access levels of the queries while masking data in the datastore.

At 810 the monitoring the queries can also include intercepting or receiving queries that are directed at a datastore. In one embodiment, the queries can be requests for information, or can represent requests for interactions or potential interactions between nodes in a graph that represent a social networking environment. In that example, the queries can request that an interaction take place, or determine if an interaction is possible. In another embodiment, the queries can be search terms to be operated on a datastore.

At 820, the analyzing the permissions associated with the queries can include analyzing permissions that come bundled with the queries. Additionally, local permissions can be embedded at a node the query was received at. In that case, the local permissions apply to all queries, and are not query specific. Local permissions can change over time and access levels can be updated in response to the changing local permissions.

In another embodiment, the analyzing the permissions can also include analyzing query contexts. Query context can include, but is not limited to, information such: source of queries; time that queries were initiated; content of queries; and location where queries were initiated. Query context can provide the sole source of information used to determine permissions and access levels, or can be used in addition to other information to define access levels of queries At 830, the queries are responded to while masking data in the datastore. The queries can be answered with the minimum amount of data to satisfy the queries, and keep the remainder of the data private. In one example, queries can be answered affirmatively or negatively while keeping the overall content or structure of the datastore private. Queries can also be answered using a datastore index. Datastore indexes can provide a summary of data stored in datastore while keeping the bulk of the data private.

Exemplary Networked and Distributed Environments

One of ordinary skill in the art can appreciate that the various embodiments for protecting privacy as described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the mechanisms for protecting privacy over big data as described for various embodiments of the subject disclosure.

Figure 9:
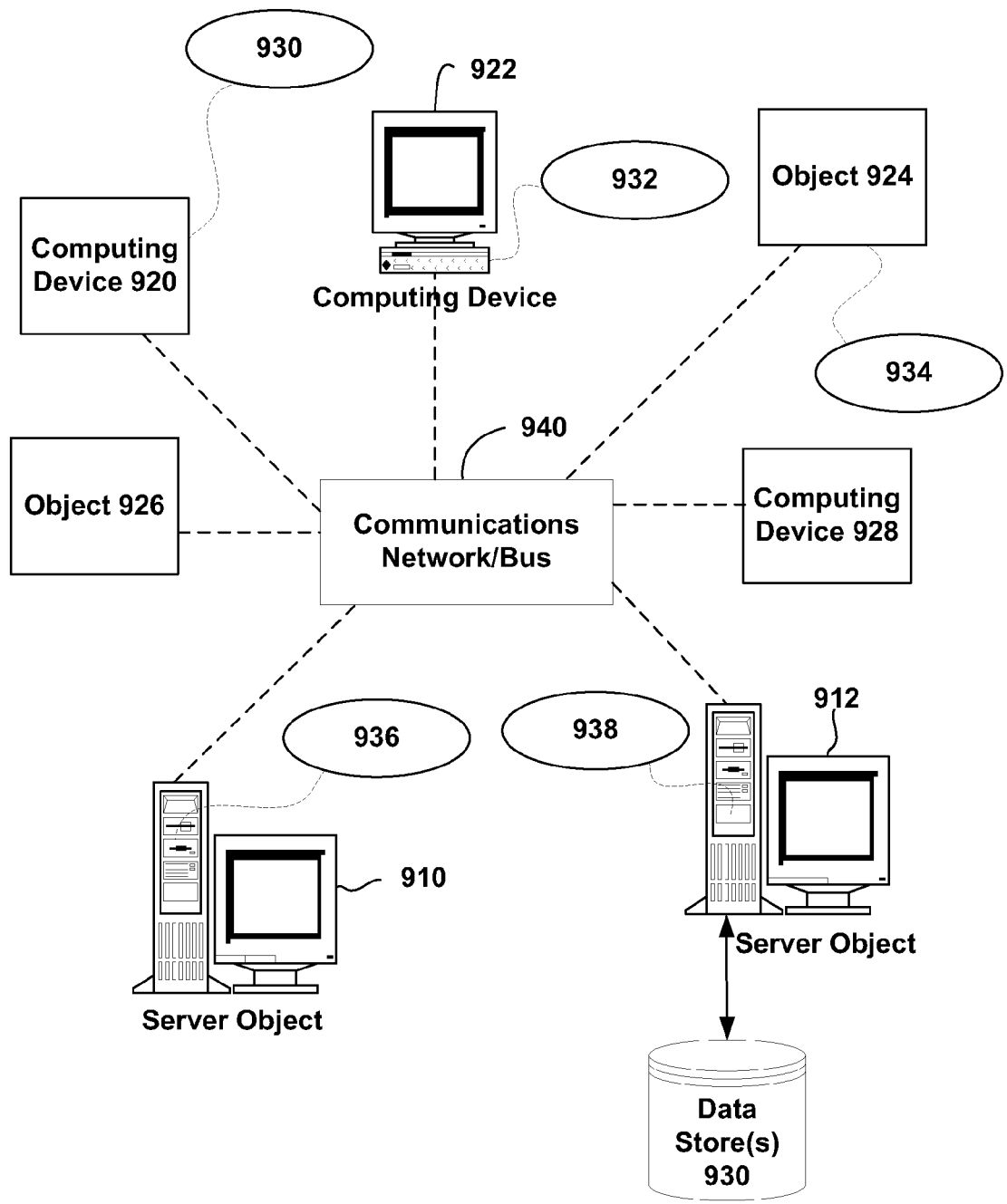
FIG. 9 is a block diagram representing exemplary non-limiting networked environments in which various embodiments described herein can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938 and data store(s) 940. It can be appreciated that computing objects 910, 912, etc. and computing objects or devices 920, 922, 924, 926, 928, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 942, either directly or indirectly. Even though illustrated as a single element in FIG. 9, communications network 942 may comprise other computing objects and computing devices that provide services to the system of FIG. 9, and/or may represent multiple interconnected networks, which are not shown. Each computing object 910, 912, etc. or computing object or devices 920, 922, 924, 926, 928, etc. can also contain an application, such as applications 930, 932, 934, 936, 938, that might make use of an API, or other object, software, firmware and/or hardware, suitable for communication with or implementation of the techniques for protecting privacy provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for protecting privacy as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 942 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Exemplary Computing Device

As mentioned, advantageously, the techniques described herein can be applied to any device where it is desirable to implement permission based query processing. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 10:
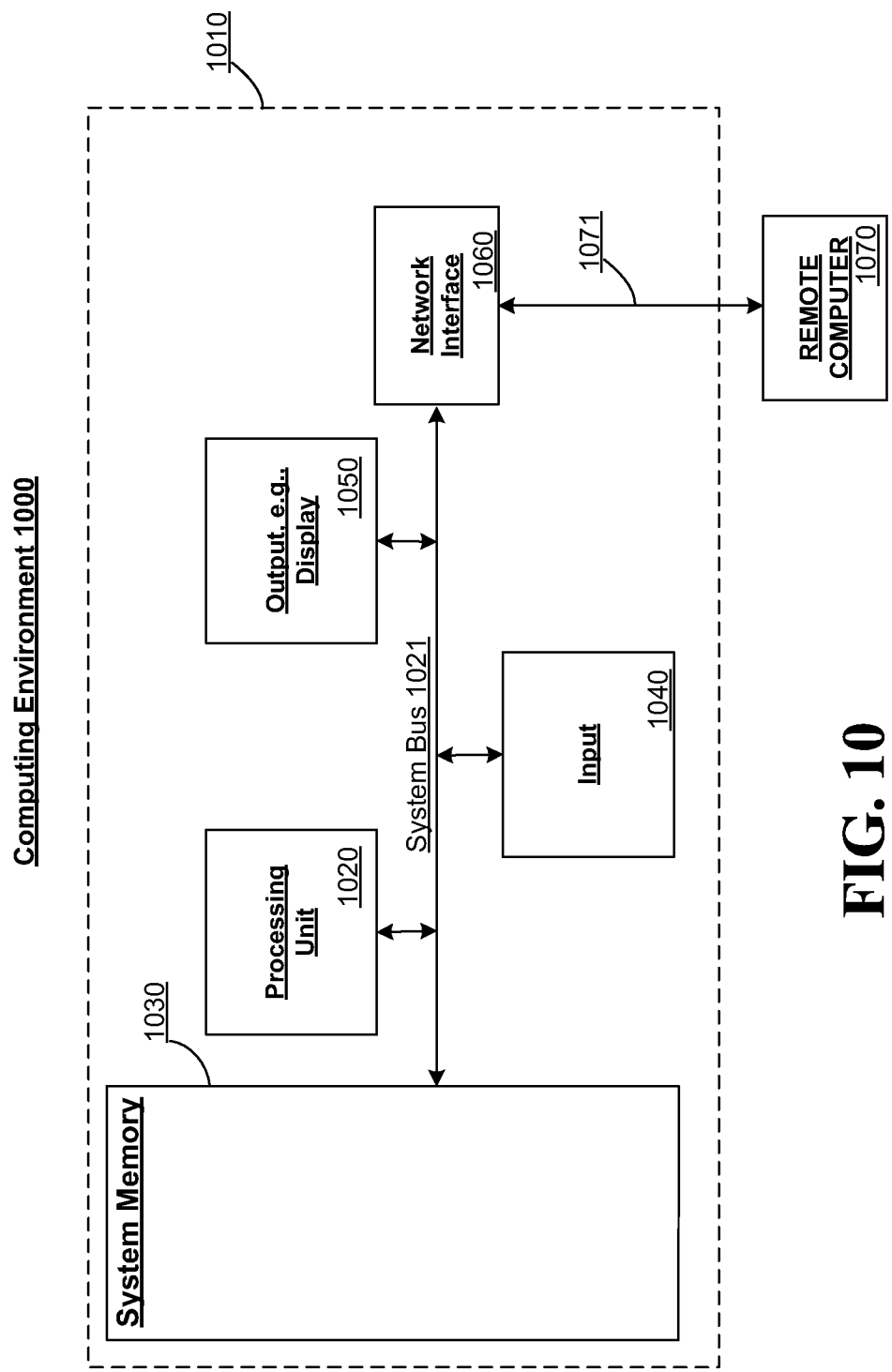
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither should the computing system environment 1000 be interpreted as having any dependency or requirement relating to any one or combination of components illustrated in the exemplary computing system environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, system memory 1030 may also include an operating system, application programs, other program modules, and program data. According to a further example, computer 1010 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections, such as network interfaces 1060, to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the subject matter should not be limited to any single embodiment, but rather should be construed in breadth, spirit and scope in accordance with the appended claims.

What is claimed is:

1. A method implemented on a computer having at least one processor, comprising:
   receiving at least one query directed at a datastore;
   analyzing a query context associated with the at least one query to determine a permission for the at least one query;
   generating at least one filtered result for the at least one query based on the permission;
   masking data in the datastore from the at least one filtered result based on the query context, so that a minimal amount of data is returned;
   constructing at least one filtered response based on the at least one filtered result; and
   providing the at least one filtered response in response to the at least one query, wherein a time to provide the at least one filtered response is randomized alternately between another response.

2. The method of claim 1, further comprises analyzing local permissions embedded at a node at which the at least one query is received to determine the permission for the at least one query.

3. The method of claim 2, further comprising updating an access level of the at least one query in response to changing local permissions at the node.

4. The method of claim 1, wherein the query context is based on one or more of a source of the at least one query, a time associated with the at least one query, or a location associated with the at least one query.

5. The method of claim 1, further comprising:
   comparing the datastore with a second datastore; and
   determining commonalities in response to the comparing by querying the datastore and the second datastore, and comparing responses.

6. The method of claim 5, wherein comparing the responses further comprises hiding data belonging to the datastore and the second datastore from each other.

7. The method of claim 1, further comprises determining an access level of the at least one query to determine the permission for the at least one query.

8. The method of claim 1, wherein the generating at least one filtered result for the at least one query further comprises answering the at least one query using a datastore index.

9. A system, comprising:
   a processor and a memory;
   the memory including:
   a monitoring component that monitors at least one query directed at a datastore;
   a privacy component that analyzes at least one permission associated with the at least one query to generate at least one filtered result, wherein the at least one permission is based on an analysis of a query context of the at least one query and wherein the at least one filtered result is based on the query context;
   a response component that answers the at least one query in accordance with the at least one permission associated with the at least one query, wherein the response component constructs one or more filtered responses based on the at least one filtered results; and
   a timing component that determines a delay time for responding to the at least one query that is independent of a size of the datastore.

10. The system of claim 9, wherein the privacy component is further configured to determine an access level of the at least one query, wherein the access level is defined by the query context.

11. The system of claim 10, further comprising a filter component that filters responses to the at least one query in response to the query contexts and a set of rules.

12. The system of claim 10, wherein the access level is based at least in part on a trust level of a source of the at least one query.

13. The system of claim 9, wherein the query context is based on one or more of a source of the at least one query, a time associated with the at least one query, or a location associated with the at least one query.

14. The system of claim 9, further comprising a comparison component configured to identify commonalities between the datastore and a second datastore, wherein data in the datastore is hidden from the second datastore.

15. The system of claim 14, wherein the comparison component is further configured to send a set of queries to the second datastore.

16. The system of claim 9, wherein the response component is configured to answer the at least one query using data from a datastore index.

17. The system of claim 9, wherein the at least one permission is based on a permission embedded at a node at which the at least one query is received.

18. A device, comprising:
at least one processor and a memory; the at least one processor configured to:
monitor at least one query directed at a datastore;
analyze a query context associated with the at least one query to determine a permission for the at least one query, the query context associated with information describing a context of the at least one query;
generate at least one filtered result for the at least one query based on the permission and masking data in the datastore from the at least one filtered result so that a minimal amount of data is returned in a response;
construct at least one filtered response based on the at least one filtered result;
generate a response time for responding to the at least one query, wherein the response time alternates between a delay time and a non-delayed time; and
transmit a response to the at least one query within the response time that includes the at least one filtered response.

* * * * *